United States Patent [19] [11] 3,812,465
Mann [45] May 21, 1974

[54] REMOTE SET POINT CONTROL

[75] Inventor: Ronald P. Mann, Shorewood, Wis.
[73] Assignee: Johnson Service Company, Milwaukee, Wis.
[22] Filed: Dec. 15, 1972
[21] Appl. No.: 315,465

[52] U.S. Cl. ........................... 340/172.5, 235/151.3
[51] Int. Cl. ............................................ H03b 3/04
[58] Field of Search ................ 318/601; 340/172.5; 235/151.3

[56] References Cited
UNITED STATES PATENTS

| | | | |
|---|---|---|---|
| 3,105,927 | 10/1963 | Flatten et al. | 318/601 |
| 3,219,895 | 11/1965 | Price | 318/601 |
| 3,237,313 | 3/1966 | Gevas | 318/601 |
| 3,248,622 | 4/1966 | Kelling | 318/601 |
| 3,487,307 | 12/1969 | Sklaroff | 318/601 |

Primary Examiner—Paul J. Henon
Assistant Examiner—Michael Sachs
Attorney, Agent, or Firm—Andrus, Sceales, Starke & Sawall

[57] ABSTRACT

A loop communication system includes a loop controller generating multiple bit message frames for selectively controlling a plurality of remotely located transducers connected to the loop by a point module set point adjustment unit having an address decoder and a command register. Each unit controls a transducer such as a D.C. motor with a feedback potentiometer and selectively connects the potentiometer to an analog-to-digital converter to convert the analog feedback signal to a digital signal such as a two digit binary-coded-decimal number to read the set point in terms of the span percentage. Each remote set point adjustment unit includes a motor selection and feedback connecting circuit coupled to the command register and responsive to a message frame to selectively latch a motor to an isolated supply and the corresponding potentiometer to the converter. A set point register is also coupled to the command register and responsive to store a desired set point. The register and converter are connected to a comparator which is operable to terminate the resetting motor. A command and interrupt section is connected to the command register and includes a latch means to establish and hold the motor and related adjustment circuitry active to complete a readjustment and further to detect the completion thereof to terminate the readjustment and initiate final communication with the communication system to clear the point module.

37 Claims, 2 Drawing Figures

FIG.1

FIG_2

REMOTE SET POINT CONTROL

BACKGROUND OF THE INVENTION

The present invention relates to a remote set point control and particularly to a remote set point control for interconnection into a data communication loop system.

In automated data acquisition and control supervisory systems, various hardware load means may be employed which are to be periodically readjusted to a different position or operating set point. A drive means may be provided to permit powered set point readjusting, either through a manual control or preferably through an automated remote control. Various controls have been suggested that employ a feedback sensing device to compare the actual set point position in combination with a corresponding command input signal means. Thus, in accordance with conventional servo-drive principles, the load means can be continuously adjusted until a feedback signal potentiometer and a command signal voltage null a signal comparator means. The comparing means may be hard-wired to the command and the feedback means. Some hard wired control systems employ an anolog-to-digital converter and digital comparison means where the digitized feedback is compared in hardware with a set point manually entered in digital form by means of switches. Further, in such systems the several points are normally monitored on a point by point basis, with each adjustment at any given point completed and only then actuating the system to proceed to the next point. Further, in the hard-wired scanned system only one set point can be adjusted at any given time.

Alternatively, a computerized system may be interconnected through a computer coupling means employing software adjusting and comparing of the set point. In such systems, the set point drive can desirably employ a servo-motor in combination with a feedback potentiometer. The output of the potentiometer provides an analog signal which is transmitted to an analog-to-digital converter to establish a digital feedback signal compared with a digital command signal by a suitable digital signal comparator until a null condition is obtained.

Although such systems are practical and have been satisfactorily employed, they require a relatively expensive analog-to-digital converter and the use of the digital comparator at the central computer. The converter is a rather expensive unit which is extremely accurate because of its application for many other uses. Though this does not detract from the set point adjustment, the latter function does increase the load on an expensive piece of hardware with a related increase in expense. The prior art software systems do permit sequential drive or readjustment of a plurality of set points simultaneously on a time multiplexing basis.

In the scanning of remote set points, the resetting set point functions are limited by the scanning speed, which indirectly limits the size or number of remote points which can be properly monitored and controlled. A highly practical loop control system employing coded digital binary information is disclosed in the copending application of Buchanan et al entitled "DATA COMMUNICATION SYSTEM EMPLOYING A SERIES LOOP" bearing Ser. No. 315,567 filed Dec. 15, 1972, the same day as this application and is assigned to the same assignee. Generally, the loop control system includes a central controller which generates multiple bit digital message frames which are sequentially transmitted through a loop system including a plurality of remote operational stations. Each station includes a plurality of load means, some of which may require periodic set point readjustment. Communication with the controller is established through digitally coded address, command and execution information carried by the message frames.

In the prior art systems having multiple remote stations, the various stations have been interconnected through a common ground return, thereby establishing an electrical interconnection between the hardware at the central control station and the several remote operating stations. This can present a source of error where a motor or like device, which inherently forms an electrical noise generator, is employed because the noise signal will be introduced into the circuit and tend to cause disruption or malfunctioning of the digital logic systems. Thus, the common ground return provides a current path such that the several points are not electrically isolated.

Further, set point in the prior art systems is generally initiated from the central location through the use of input switches or the like and furthermore is entered as an increment or decrement change from a present set point. The prior art does not provide a means of introducing an absolute value of a desired set point.

The prior art devices require relatively complicated OR systems and ones which are limited with respect to the speed as well as the number of remote set point means which can be properly monitored and controlled. Although such difficulties can be tolerated, they become particularly undesirable in the high-speed control systems where information can be otherwise rapidly transmitted throughout the system, such as shown in the Buchanan et al. application.

SUMMARY OF PRESENT INVENTION

The present invention is particularly directed to an improved and novel remote control and drive system particularly adapted to produce accurate and high resolution set point readjustment of various load means.

Generally in accordance with the present invention, each of the remote stations which is to be controlled from one or more remote control centers is provided with a self-contained set point adjustment means which can directly effect readjustment of one or more load means in response to coded reset information received from the central control center. The self-contained set point adjustment means is coupled into a communication or data transmission network to receive the necessary information and then complete the necessary readjustment while disconnected from the network such that the latter can proceed with the other necessary or desired data transmission. Upon completion of a readjustment, the remote load means automatically transmits the necessary information to the central station. Thus, the high-speed communication system or network is employed to only transmit and receive the necessary information regarding the initiation and termination of the set point. A plurality of set point adjustments at different load means can be simultaneously in process without in any way affecting the response characteristic of the data transmission network. Further, the self-contained construction permits the convenient and complete electrical isolation of the readjusting circuitry from the central location hardware and in particular isolation of a transducer and servo-positioning motor from the remote readjustment circuitry.

In accordance with a preferred construction of the present invention, the remote station is provided with a unique address to permit interfacing with a plurality of other remote load devices or means. One or more adjustable elements or set point devices are interconnected to a common address with a coded selection means for selective connecting of the load means to the set point adjustment means. In addition, the system includes a register or storage means to receive and store a commanded set point value which, in an optimum and preferred novel construction, is established as a percentage of the total set point range. The information is, therefore, encoded from 0 to 99 percent of the total load means span. The self-contained, set point adjustment means includes a small analog-to-digital converter means connected to convert the output of a feedback transducer means to a corresponding digital signal. The command set point signal is compared with the stored set point digital signal through a suitable comparison means. The output establishes individual signals related to a null or a not-null condition to continuously reset the device until the null condition is established. The comparison means preferably provides an output relating to an "equal" null comparison and another output relating to a "less-than" null comparison with respect to the commanded set point. The "less-than" signal is employed to actuate a switching means such as a simple relay to control the directional drive of the transducer means for corresponding repositioning of the set point.

As applied to the loop type message control system, a set point readjustment is initiated by first transmitting a message frame to a particular point module with means to also select and interconnect one of the transducers of the module to the set point adjustment means. A subsequent frame introduces the commanded set point into the system and initiates the actual readjustment. Once the two messages have been received, the readjustment means completes its function completely independent of and disengaged from the continued operation of the loop network. When readjustment has been completed, however, the request or interrupt signal is automatically created to select a free or available message frame circulating in the system and to introduce into such frame a notification message indicating such completion. The notification frame may, in addition to containing the address of the module, also indicate which transducer has been activated and contain information as to the status of the circuit. The loop controller recognizes such a notification frame and generates an acknowledge frame with a read command to reset the remote station and return the contents of the set point feedback register to the loop controller for final checking. It may also result in recycling of the analog-to-digital converter to standby.

The loop controller can also create an inquiry command message frame which is transmitted to a corresponding remote module to obtain the status information received from a notification frame. Similarly, a special read frame with a read command can be transmitted to read the setting of a selected transducer feedback unit. The system can operate under the interlocking control, of course, provided for the basic loop system of the previously referred to Buchanan et al. application.

In a particularly satisfactory and optimum construction, one point module is constructed to control up to four different transducers and includes a two-digit binary-coded-decimal analog-to-digital converter having an input selectively connected to the several transducer units and particularly the feedback potentiometer of a particular transducer unit. The feedback potentiometer are coupled to individual transducer motors, and a potentiometer is set in either direction from its present position simultaneously with resetting of the load set point in either direction from its present position. The output of the selected feedback potentiometer is a voltage related to the corresponding set point. This is converted into a two-digit binary-coded-decimal signal, thus providing an eight bit output signal. The output of the analog-to-digital converter is fed into a set point feedback register, the output of which is connected as one input to a digital comparator. A set point input register, which is coupled to the communication system and particularly to a common input point module signal bus, provides a related set point input signal in corresponding eight bit binary BCD form to the digital comparator. The output of the digital comparator provides two related signals preferably at individual signal outputs and respectively indicating an "equal" or null condition between the register, and a "less-than" actual set point.

The transducer drive circuitry is activated in response to a special command message frame from the central station which sets a flip-flop, the output of which constitutes a transducer drive enable latch. An interrupt signal means is connected to generate an interrupt signal when the output of the comparator indicates a "null" or "equal to" condition. The transducer drive enable latch means also preferably includes monitoring circuits for monitoring the analog voltage and logic voltage supplies for such module. If a power failure is encountered, it automatically creates a signal to terminate the cycle of operation and prevent erroneous adjustments of transducers.

The analog-to-digital converter includes a start signal connected for selective actuation from logic timing means such as a one-shot unit which is connected for operation from a two-input gate having a pair of inputs. The done output of the analog-to-digital converter drives a second timing means which is connected to one of said inputs, with the rising edge on the done output recycling the operation of the analog-to-digital converter. The second input is connected to the interrupt signal and voltage monitoring circuit which actuates the gate to terminate the cycling.

In a particularly practical and novel embodiment of this invention, the set point readjustment means includes a plurality of individual relays for selectively connecting each of the motor means such as D.C. motors of the several transducers to a suitable isolated D.C. power supply. The motor drive relays are preferably multiple contact units which when deenergized create a short circuit across the motor armature and dynamically brake the motor for rapid and accurate setting of the transducer. The output of the point selection register is connected to the transducer selection relays through logic gates which are conjointly controlled through a further gate in response to an enable signal and the "equal to" output of the comparator.

The point selection register is connected to the point module bus and selectively connected to simultaneously couple a feedback potentiometer to the analog-to-digital converter with the selection of the corresponding motor means. A potentiometer multiplexing network may employ field effect transistor switches connected to respond to the register outputs. The drive direction is controlled from a directional relay and a logic gate connected to the output of the comparator and to the drive enable latch output. If the set point is to one side of the null position, the gate is activated and responds to the drive enable latch output to energize the directional relay and provide for the reverse motor connection, thereby establishing the proper directional rotation.

In operation, a message frame received at the point module selects a transducer and related motor. A second message frame loads the set point input register and initiates the set point readjustment by setting of the motor enable latch. The system continues to operate independently of the network through the self-contained transducer resetting mechanism. The analog-to-digital converter continuously cycles and digitally tracks the selected feedback potentiometer. The output is clocked into the set point feedback register where it is fed to the comparator for comparison with the set point input signal. When the digital comparator indicates a null or "equal to" condition, a corresponding output deenergizes the tracking and drive system by operation of the interrupt or request latch, which also requests communication with the central station to transmit the information regarding the setting and also to clear the system. Available frames are selected and a message directed to the loop controller until acknowledged by the loop controller through a message frame with a read command signal. Such frame clears the interrupt and simultaneously introduces into the corresponding acknowledgement frame the setting of the set point feedback register, thus returning the final set point information to the loop controller. The acknowledgment also causes the analog-to-digital converter to begin recycling to the standby or reference position.

In this manner the remote station can provide for the automatic readjustment of any desired set point within the capability of the point module control. Further, each of a plurality of point modules can be activated in proper sequence and each can be simultaneously effecting a readjustment.

Further, the loop controller can issue a particular command to the corresponding module to obtain the status information corresponding to that normally provided in an available frame upon termination of the readjustment. The conventional read command can also be transmitted to read the transducer feedback potentiometer setting.

In addition, when connected into a loop controller system, the system employs a multiple bit message frame concept such as disclosed in the previously referred to Buchanan et al application and responds to parity errors to inhibit the execution of the commands and thereby maintain the integrity of the information The present invention has been found to provide a reliable remote set point adjustment which is particularly adapted to a loop control system wherein a significant number of remotely-located points selectively require readjustment. The concept of merely providing start-stop type controls with the remote load means completing their operation and then transmitting the information to the loop controller permits the rapid activation and control of the remote set points, while maintaining the advantages of the high speed communication loop to also perform the other necessary system functions. The system provides for convenient communication and in particular provides setting of the set point as an absolute value rather than as a change from a given set point. This system also permits the application to entry of the information not only from a central controller but from any other suitable input device such as the operator console, teletype units and the like, such as disclosed in the basic Buchanan et al application. The transducer can, of course, be any device which will produce an analog signal which can be applied to the analog-to-digital converter to produce a corresponding digital output.

BRIEF DESCRIPTION OF DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF ILLUSTRATED EMBODIMENT

Figure 1:
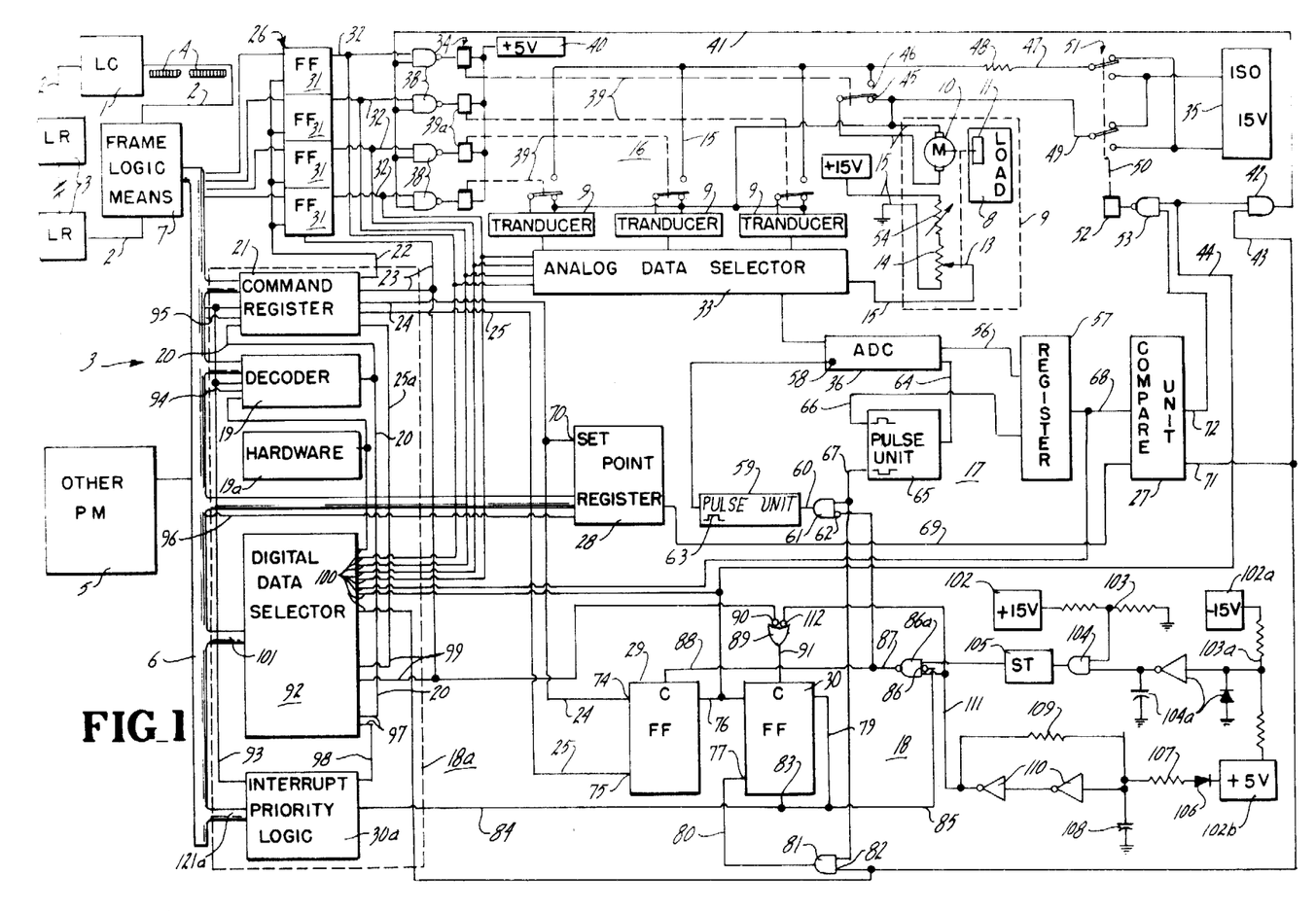
FIG. 1 is a schematic diagram of a serial loop communication system employing a plurality of interconnected remote stations, at least one of which includes a set point adjustment means constructed in accordance with the present invention.

Referring to the drawing, the present invention is shown in connection with a data communication loop system employing a central loop controller 1 serially coupled by a loop communication cable 2 to a plurality of similarly constructed remote stations 3, generally as more fully disclosed in the previously referred to Buchanan el al application. Thus, the central controller 1 generates message frames 4, each of which includes a plurality of digital logic bits. The frames 4 are circulated in serial fashion throughout the loop to establish communication with the remote station 3 in a selected manner. Each of the remote stations 3 generally includes a plurality of different point modules 5 coupled via a common input-output signal bus 6 to a message frame handling means 7 which is connected to the cable 2 to receive and retransmit the message frames, as shown for the first remote station. The frame handling means 7 selectively transmits the digital information of the message frames 4 to the several point modules 5 and retransmits the information modified or unmodified, as required, for communication with the loop controller. Each of the point modules 5, in turn, includes the necessary logic means for receiving the information from an appropriate message frame 4 via the signal bus 6 and processing the information to provide for the selected operation of operating hardware or other load means 8 such as set point adjustment, checking the status of the hardware, and/or receiving information from the hardware. For example, the system may be adapted to read an analog output of a temperature sensor. Alternatively, a point module may perform start-stop motor control with sensing of the status of the motor operation.

The message frames 4 are divided into a plurality of bit subgroups to provide for selective addressing of the remote station 3, the point module 5, as well as the particular load means and function, as more fully disclosed in the Buchanan et al application.

The present invention is particularly directed to a set point adjustment module 5 which permits the automatic remotely-controlled resetting of the set point of a load means 8 at a remote station 3 and is particularly set forth with respect to a remote set point control module 5 shown at the first remote station 3. In the illustrated embodiment of the invention, a plurality of similar remote transducers 9 are interconnected through the single module 5 for communication with the loop controller 1. Each of the remote transducers 9 is similarly constructed, and reference is made to one transducer. The transducer shown includes a servo-positioning motor 10 coupled to the load means 8 and particularly to an adjustable control 11 for setting of the operating point or set point for such load means 8. The motor 10 is also coupled to correspondingly and simultaneously position a related signal means shown as the contact 13 of a feedback potentiometer 14. The tap contact 13 provides an electrical voltage signal directly related to the set point setting of the load means 8.

The several remote transducers 9 may be immediately adjacent to the remote station 3 or may be relatively remote therefrom. Thus, in a practical application remote transducers 9 can readily be located in the order of 500 feet from the point module and interconnected thereto through the usual well-known number 18 AWG wiring 15 for supplying power to the motor 10 and to the feedback potentiometer 14.

The several remote transducers 9 are selectively coupled at the point modules to the frame handling means 7 for selective interconnection with the loop controller 1. Thus, the message frames 4 from the loop controller 1 selectively initiate a set point readjustment or perform a read-out of the status of any one of the remote feedback potentiometers 14.

Only one set point readjustment can be in operation for any given point module 5 at any given time, but a plurality of adjustments at different point modules at the same or different remote stations 3 may be simultaneously in operation, as each module 5 provides for selective operation at any given time of one of four different transducers 9. Generally, the controller 1 of the loop system may provide for up to 62 set point modules 5 at each station 3. In a loop system including 31 remote stations 3, there, thus, may be as many as 1,922 readjustments in progress simultaneously.

Each set point module 5 is similarly constructed, and a preferred construction is shown and presently described. The module 5 includes a self-contained and automatic set point readjustment means which is activated by a suitable message from the loop controller 1 addressed to the particular remote station 3 and to the particular point module 5, such information being transmitted via the frame handling logic 7 to the point module, which selects and operates one transducer 9. The message frames 4 may be similar to those generated and described in the Buchanan et al. application and include four immediately successive eight-bit bytes including a station address byte, a point module address byte, a command and status check byte and finally a point module data byte. Each byte includes a parity check to insure the integrity of the transmitted message frames.

The set point module 5 as illustrated generally includes a transducer drive and selection circuit or section 16, an analog-to-digital conversion and signal comparing section 17, an interlocking control section 18 which is operable to initiate adjustment and to detect the completion of the set point readjustment cycle, and a decoding and interface section 18a which provides for communication with the frame logic means 7 via the signal bus 6.

The decoding and interface section 18a first includes an address decoding and enabling register 19 such as the six bit unit disclosed in the copending application of Strojny et al entitled "STATUS SENSING AND TRANSMITTING CIRCUIT," bearing Ser. No. 315,573 filed Dec. 15, 1972, on the same day as this application and which is assigned to the same assignee. The register 19 is connected to the common input-output bus 6 and responds to a corresponding binary coded input. The decoder register 19 establishes an enable signal at an output line 20 when the point module address contained in the message frame matches the hardware programmed address 19a in the point module. The enable signal activates the point module for further processing of the message frame 4, and particularly a command decoding register 21.

The command register 21 includes a plurality of inputs, shown as four, coupled to the bus 6 and is responsive to a corresponding number of succeeding data frame bits of the message frame to establish an appropriate signal at a point selection command output line 22, a read command output line 23, a write command output line 24, a write-or-select command output line 25, and an inquiry command output line 25a. The several command signal lines 22–25 control the automatic readjustment sequence. The inquiry command signal line 25a provides the point module with the means to transmit its status to the loop controller when requested.

Generally, a transducer selection register 26 is connected to the incoming bus 6 and responds to the data byte of a first message frame 4 to operatively activate one of the four transducers 9 for connection to the signal comparing section 17 having a signal comparator 27. A set point input register 28 provides a second input to the comparing network and particularly comparator 27. Register 28 is connected via the bus 6 to the loop system to receive a set point for the selected transducer 9 from a subsequent incoming message frame 4.

This second frame 4 also sets register 21 with an output at line 24 and commands the system to initiate and complete a set point readjustment. The initiation of the readjustment cycle is interlocked through special motor enable latch circuit 29 of section 18 which is coupled to the command register 21 to respond to selected write and select signals of the command register 21 to initiate a readjustment. An interrupt register 30 responds to the end of the cycle and initiates communication with the loop through an interrupt and priorty logic unit 30a such as more fully described in the previously identified copending application of Strojny et al. entitled "STATUS SENSING AND TRANSMITTING CIRCUIT," and which was filed on the same day as this application and is assigned to the same assignee.

More particularly, the point selection register 26 includes individual flip-flop circuits 31 for each transducer 9, and each flip-flop includes an individual binary input line to bus 6 for selection of a transducer in response to receipt of a logic 1 bit at the corresponding flip-flop input. Thus, the last four bits of the final data byte of the first message frame 4 in the sequence are provided for selectively enabling one of a transducer systems by introducing a logic 1 signal at the corresponding flip-flop input line. Enabling of the point selection register 26 is controlled by the connection of the command signal line 22 as an interlock to the clock input of the several flip-flops 31 such as shown in the previously referred to copending Strojny et al. application. Once introduced, one of four register output lines 32, each of which is thus related to a particular transducer system 9 including the motor 10 and the feedback potentiometer 14, is correspondingly provided with an enable-to-select logic signal, generally a logic 1. A suitable transducer potentiometer selection multiplexer or switching network 33 is controlled by lines 32 to interconnect the selected potentiometer 14 into the self-contained readjustment system and particularly the comparing section 17. A transducer motor relay network 34 responds to the logic 1 at a line 32 to enable the connection of the corresponding motor 10 to an isolated 15 volt D.C. supply 35. Actual connection is effected upon receipt of the write command message containing the set point information.

More particularly, the network 33 is a suitable field effect transistor network having individual transistors, not shown, and each of which selectively interconnect a potentiometer tap 13 to the output line of the multiplexer 33 which, in turn, is connected to the analog input line of the analog-to-digital converter 36 of section 17.

The selection register output lines 32 are connected to relay unit 34 through individual two-input Nand gates 38 to control corresponding related individual relays 39 forming the motor selection switching means. Thus, each relay 39 includes a coil 39a having one end connected in common to a five-volt power supply 40. The output of the Nand gate 38 is connected to the opposite side of the coil 39a of the corresponding relay 39. The one gate input is connected to the corresponding selection output line 32, and the second input is connected to an interlocking enable line 41 and thus to a common logic And gate 42, which is conjointly controlled by an output of the digital comparator 27 through signal line 43 and the output of the motor enable latch 29 through signal line 44. Each relay 39 is shown as a single pole, double-throw unit, having normally closed contacts 45 connected directly across the corresponding transducer motor 10 and particularly the armature. This short circuits the motor armature and creates dynamic braking for accurate and rapid stop positioning of the motor 10 and interconnected transducer potentiometer tap 13. A set of normally open contacts 46 of the relay 39 connects one side of the corresponding motor 10 to the isolated voltage supply input line 47 in series with a common armature resistor 48. The same resistor 48 is employed for all transducer motors 10 as only one of the motors is interconnected into the circuit at any one time. The opposite sides of the motors are connected in common directly to the second connection line 49 to the isolated voltage supply 35. The voltage supply connection further includes a reversing relay 50, which is shown as a well-known double-pole, double-throw relay, and having contacts 51 which selectively interconnect the motor input lines 47 and 49 in a forward polarity drive and a reverse polarity drive to the isolated D.C. voltage 35 to thereby provide for forward and reverse rotation of the transducer motor and associated potentiometer tap. The reversing relay includes a winding or coil 52 connected to the 5-volt supply through a Nand gate 53 which is conjointly controlled by an output of the digital comparator 27 and the motor enable latch signal line 44.

Thus, in summary, the setting of the point selection register 26 from the message frame 4 results in the transmission of a logic 1 signal on one of the output lines 32 to the potentiometer multiplexing network 33 to connect the corres-ponding potentiometer tap 13 into the circuit. The logic signal selects the corresponding Nand gate 38 so that when the signal line 41 is brought to a logic 1 later in the sequence, the corresponding motor 10 is interconnected to the isolated supply 35 through the relay network 34.

The digital comparator 27 determines the particular direction of rotation of the activated transducer motor 10 as a result of comparing the digitally converted output voltage of the selected set point potentiometer tap 13 with the set point input signal appearing in the set point register 28, as follows. The transducer potentiometer 14 includes a wound resistor connected to a positive 15-volt power supply in series with an adjustable trim potentiometer 54. A voltage signal at the tap or contact 13 is proportional to the position of the tap on the resistor. This signal is selectively applied via the analog data selector 33 to the analog input of the analog-to-digital converter 36, which may be any suitable construction, to establish a directly related binary-coded-decimal output. It is preferably a two-digit binary-coded-decimal converter of the successive approximation type with a conversion time of a maximum of 1 millisecond. The output at line 56 is an eight-bit wide digital output, with each four bits related to one of two significant digits of the binary-coded-decimal number. This permits the conversion of the transducer or feedback analog signal to a binary-coded-decimal digital signal corresponding to an adjustment of from zero to ninety-nine per cent of the total set point adjustment span.

The output of the analog-to-digital converter 36 is selectively transferred to a set point feedback register 57 within which the signal is selectively set as presently described.

The converter 36 has a start signal input line 58 connected to a pulsing start unit 59, shown as a one-shot circuit unit. Such a unit 59 may generate an output pulse, which may have approximately one-half millisecond duration, in response to an appropriate signal at the trigger or input terminal line 60. Generally, the one-shot unit 59 is constructed to generate a logic 1 pulse in response to the rising edge of a logic 1 input signal. Such a signal is applied to the input line 60 from a two-input And gate 61 having an inverting input terminal 62 connected to the interlocking control section or circuit 18, as subsequently described. Generally, when an analog-to-digital conversion is to be initiated, a logic 0 is applied to the inverting input 62 to provide a logic 1 signal at the output of gate 61. The rising edge of this signal fires the one-shot unit 59 to produce a corresponding timed output signal or pulse 63. The analog-to-digital converter 36 initiates a cycle which reads the analog voltage signal and produces a corresponding eight-bit wide digital BCD output signal at line 56. A feedback system produces an output signal via a done terminal at line 64 to the input of a second timing or pulse forming unit 65 also shown as a one-shot unit. Pulse forming unit 65 generates two timed pulse outputs, a positive or logic 1 pulse on line 66 and an equal duration negative or logic 0 pulse on line 67, both of which may be approximately one-half millisecond duration and occur in response to the rising edge of a logic 1 input signal. At the end of an analog-to-digital conversion, the output of the done line signal rises and activates the second one-shot unit 65 to generate the positive and negative pulses at its outputs.

The positive timed signal or pulse is supplied via the register clock line 66 to the clock input of the set point feedback register 57 to clock the digital output of the analog-to-digital converter into the register 57. The negative pulse is also applied via the line 67 to the second input of the And gate 61 to again fire the start one-shot unit 59, which initiates a subsequent cycle of the analog-to-digital converter 36 to again initiate a corresponding conversion cycle. Thus, the analog-to-digital converter 36 is continuously cycled and digitally tracks the feedback potentiometer 14 with the information sequentially fed into the set point feedback register until such time as a positive disable signal is applied via the inverting input 62 to the And gate 61. This is effected as hereinafter described as a result of an interconnection through the comparator network 27.

Thus, the comparator 27 is a two-digit BCD digital comparator having a first eight-bit wide input line 68 connected to the output of the set point feedback register 57. A second eight-bit wide input line 69 is connected to the output line of the set point input register 28. The latter is set to a predetermined percentage number by a message frame 4. The set point input register 28 is coupled to the common signal bus 6 and is set with a two digit BCD set point contained in the final byte of a message frame 4. The set point register 28 has an enable terminal 70 connected to the write line 24 of command register 21 to set the binary-coded-decimal number therein. The two digital numbers are compared in the hardware of the digital comparator 27, which may be of any suitable and well-known construction. It continuously compares the contents of the two registers and produces a signal at one of two output lines 71 and 72. Line 71 has a logic 1 signal when feedback registe 57 is "equal to" the set point input register 28. The second line 72 has a logic 1 with the feedback register 57 "less than" the input register 28 and is referred to as the "less than" signal line.

The output lines 71 and 72 of the digital comparator 27 are connected into the interlocking control circuit 18 and to the transducer multiplexing and selection circuit 16 to control the operation of the self-contained readjustment means and apparatus.

Thus, the interlocking control circuit 18 includes a motor enable latch means 29, shown as a conventional D-type flip-flop circuit having a pair of inputs 74 and 75 connected to the circuit command register 21. The output line 76 constitutes a motor enable latch (MEL) line which is connected to control completion of the selection circuit 16 and, through the data input 77, to enable the setting of the interrupt and clear latch circuit 30 as follows.

The latch flip-flop 29 includes a data input 74 connected to the write command signal line 24 from the command register 21 and a clock input 75 connected to the write-or-select line 25. Thus the flip-flop 29 responds to a write command signal and a simultaneous write-or-select command signal, both generated in the command register 21 by the message frame 4, and particularly the second message frame in the sequence, by setting its output line 76 to a logic 1 condition. The MEL line 76 is first connected as a common input to the And gates 38 via line 44 of gate 42 for enabling of the motor selection relay circuit 34, and simultaneously to the Nand gate 53 for the directional control relay 50. An inverting input line 43 of the And gate 42 is connected to the comparator "equal to" line 71. At the initiation of a new set point adjustment, the "equal to" line 71 will be a logic 0, which is inverted as a logic 1, a corresponding logic signal is applied to all relay selection Nand gates 38, and that gate also enabled by the selection register 26 energizes the appropriate relay 39.

The particular drive direction will depend upon whether or not the feedback register 57 is at a greater or smaller signal reading than that of the input register 28. Thus, the second input of the directional Nand gate 53 for the reversing relay is connected to the "less-than" comparator line 72. If the "less-than" condition exists, indicating the set point is to be increased, the "less-than" line 72 is at logic 1. When the MEL line 76 is also set to logic 1, the relay 50 will be energized to reverse the direction of motor drive connection and thus properly drive the load means 8 and the potentiometer tap 13 toward the desired set point. The write command signal is transmitted to the point module to load the new commanded set point into the set point input register 28 and to set the flip-flop latch 29 to thereby operate the selected relay and maintain such circuitry energized until the "equal to" line establishes a logic 1 signal.

The system is only enabled by setting of the flip-flop line 76 which is in response to the receipt of a write command via the command register 21 from the loop controller 1. However, once the system latch circuit 29 and the selection and set point input registers 26 and 28 are set, the motor drive and conversion continue independently of any further setting from or communication with the loop system.

The MEL line 76 of the enable latch 29 is also connected as the data input of a terminate and interrupt latch 30, also shown as a conventional D-type flip-flop circuit. The output line 79 taken from the positive side generates a terminate and interrupt signal and is identified as the interrupt line. The signal line 76 enables the interrupt latch to be set in response to a clock input at the clock line 80 of latch 30. Line 80 is energized from an And gate 81.

The "equal to" line 71 of the comparator 27 is connected to input 82 of the And gate 81, the opposite input of which is connected to the negative pulse output line 67 of pulse unit 65. Thus when a feed back register clock pulse on line 66 for updating the contents of the register 57 is terminated, and thereby line 67 returns to a logic 1; and the digital comparator 27 generates the "equal to" signal as a result of this most recent update of register 57, then a logic 1 is generated at the output of gate 81. This logic 1 is transmitted to the clock input 77 of the interrupt register or flip-flop latch 30. This sets the interrupt latch and generates a logic 1 output at the interrupt line 79, which also is connected directly to the preset input 83 thus maintaining the state of flip-flop 30 unitl a logic 1 is transmitted to the clear input via a ling 91. The interrupt signal is transmitted via a line 84 to the interrupt and priority logic 30a for selection of an available message frame for communicating to the loop controller 1 that the adjustment has been completed and thereby requesting an acknowledge frame 4. The interrupt signal line 79 is further connected by a stop signal line 85 to the inverting input 86 of a three-input Nand gate 86a, the output of which constitutes an MEL disable signal line 87. The other two inputs of the Nand gate means are connected to power supply monitoring circuits and will be subsequently described.

The interrupt signal creates a logic 1 signal at the disable line 87 which is first transmitted via a line 88 to the clear input of the MEL latch 29, and removes the enable signal at the MEL line 76. As a result, the relay drive circuit 16 is cleared, the motor relay 39 deenergized, and the normally closed contacts 45 create a short-circuit condition across the motor 10 to dynamically brake the motor and accurately position the set point. The interrupt signal line 79 also is coupled through the MEL disable line 87 to the inverting input 62 of the And gate 61 for controlling the analog-to-digital converter 36 of section 17. Thus, the interrupt logic 1 signal holds the And gate output 60 at a logic 0 to prevent further cycling of the analog-to-digital converter 36 by preventing the transfer of the cycle from the done output.

The point module interrupt flip-flop 30 remains set through the preset coupling signal to continuously request an available frame 4 from the loop system. When an available message frame 4 is received, the frame handling logic means 7 converts it into an assigned frame for the set point module 5. The assigned frame 4 is coupled to the point module 5 which introduces the point module address therein. The set point module also enters into the final data byte the contents of the point selection register 26 to identify the transducer means 9 which has been activated, the start of the MEL latch 29 to verify that it has been cleared, and the "equal to" output line 71 of the digital comparator 27 to verify proper completion of the adjustment. This information is transmitted by the assigned message frame to the loop controller 1 where it is properly interpreted as the proper completion of the set point adjustment for the particular transducer means and load means at the identified point module 5. The loop controller 1 then generates a dedicated acknowledge message frame which includes a read command code in the command byte. This message is transmitted and coupled via the bus 6 to the point module 5, with the command register 21 decoding the command code to set the read output line 23, which is connected to clear the interrupt latch 30. An OR gate 89 includes a first input 90 connected to the read command line 23 and the output connected by line 91 to the clear input of the interrupt latch 30. The read command signal thus resets the interrupt register or flip-flop 30 and removes the interrupt signal at line 79. The clearing of the interrupt signal also removes the logic signal from the disable Nand gate 86a, thereby reestablishing the signal at the disable MEL line 87. This removes the latch from the And gate 61 of the analog-to-digital converter control circuit, and the latter again begins to cycle. The read command is also effective to couple the output of the set point feedback register 57 into the corresponding acknowledgment frame 4, which is transmitted back to the loop controller. This again verifies proper set point adjustment.

The system has, thus, automatically reset the desired set point, transmitted the new set point as reset to the loop controller 1, and cleared the total system to await further instructions.

The communication between the frame logic means 7 and the point module 5 is achieved by means of the decoding and interface section or circuit 18a. This section includes the command register 21, the hardware programmed address unit 19a, the address decoder 19, a digital data selector unit 92, and the interrupt and priority logic unit 30a.

The operation of the command register 21 and address decoder 19 were discussed previously. The command register 21 and the enable signal line 20 of the address decoder 19 are reset or cleared by a general reset pulse 92 at a common reset line 93 generated by the frame logic means 7 at the end of each message frame 4. Also, not shown in detail in FIG. 1, the point select register 26, the command register 21, the address decoder 19, and the set point register 28 are preferably connected to bus 6 to all receive information on the same eight data-signal lines of the signal bus 6 via successive bytes of the message frame 4. This is accomplished by means of three enable control-signal lines 94, 95 and 96 which, when individually pulsed by the frame logic means 7, indicate the presence of address, command, or data, respectively, on the eight data-signal lines. The control signal pulse indicating data is combined with the outputs of the command register 21 to route information to either the point select register 26 or the set point register 28.

The digital data selector 92 transmits information to the frame logic means 7 via the signal bus 6 to be filled into message frames 4 leaving the remote station 3. The selector 92 includes a pair of inputs 97 and are used to enable the digital data selector 92 for transmission. Thus the selector 92 is enabled by the output signal at line 20 of the address decoder 19, when the point module is being addressed or by a return enable line 98 from the interrupt and priority logic 30a when the point module is filling in an available frome.

The selector 92 further includes a pair of selection control inputs 99 which determine the connection of data inputs 100 which are to be transmitted on the eight output lines via coupling cable 101 to the signal bus 6 and hence to the frame logic means. Thus, when an enable signal is generated at line 20 and is received from the address decoder 19 and a read command signal is obtained from read line 23 of the command register 21, the eight bit wide output of the feedback register 57 is transmitted to the frame logic means 7. Also, when the inquiry command signal ia generated at line 25a, the four bit output 32 of the point select register 26 and the MEL output line 76 and the "equal" output 71 of the comparator 27 are transmitted to the frame logic means 7. Finally, when the enable signal for the data selector 92 is generated from the output line 98 of the interrupt logic 30a, the hardware programmed address of unit 19a is transmitted over the signal bus 6 and subsequently, the point select register outputs 32.

The interrupt and priority logic 30a performs three functions for the point module. First, when an interrupt signal is generated at line 79, the interrupt logic 30a informs the frame logic means 7 that this particular point module requests an available frame. This request can be forwarded to the loop controlled 1 by means of an interrupt pending bit of the message frame 4 as disclosed in the Buchanan et al. application. Secondly, when an available frame 4 is incident at the frame logic means 7, the interrupt logic means 30a of all point modules at the particular remote station decides, by way of priority employing a proximity technique, which one of the many point modules may use that particular available frame. Finally, if the set point module has the proper priority, the interrupt and priority logic at line 98 enables the digital data selector 92 to sequentially transmit the programmed point module address appearing in the hardware unit 19a and the outputs appearing at the flip-flops 31 of the point select register 26 to the frame logic means 7 to be filled into the outgoing message frame 4. The interrupt and priority logic 30a is also cleared by the general reset signal established via the common reset line 93.

The illustrated circuit further includes the voltage supply monitoring means connected to the Nand gate 86a to prevent malfunction of the self-contained readjustment means if the main operating power is lost or logic power fails temporarily and is restored. The system will preferably include means to transmit the evidence of a voltage failure to the loop controller 1; for example, by setting of a power failure bit in the message frame 4 as described in the copending application of M. Frank Chacon entitled "MULTIPLE VOLTAGE MONITORING SYSTEM," bearing Ser. No. 315,569, filed Dec. 15, 1972, the same day as this application and is assigned to the same assignee.

In the illustrated embodiment of the invention, the point module power system includes a positive 15-volt D.C. supply 102, a similar negative D.C. 15-volt supply 102a, and a positive 5-volt D.C. logic supply 102b, each of which is separately monitored. The positive voltage and the negative voltage are similarly connected into a resistance pull-down and pull-up network 103 and 103a, similar to that disclosed in the above referred to copending application. The sensed positive voltage is connected directly to the input of an And gate 104. The sensed negative voltage supply is further connected through a clamping diode and inverter and an integrating capacitor defined as input 104a to the second input of the gate 104. A Schmitt trigger 105 is controlled by the output of the gate 104 and connected as a second input signal to the input of the disable Nand gate 86a. The logic power supply 102b is monitored through a power-up reset pulse circuit including a diode 106 interconnecting the supply to a series discharging resistor 107 and capacitor 108 to common ground. The junction of the resistor and capacitor is connected by a parallel netowrk including a relatively large resistor 109 and a pair of cascaded or series-connected logic inverters 110 to a power-up reset pulse signal lime 111, which is connected as the third input to the Nand gate 86a. The logic supply monitor output line 111 is also connected to the second inverting input 112 of the OR gate 89 to the clear input of the interrupt flip-flop 30.

If the logic voltage supply fails and recovers, the monitoring circuit maintains a logic 0 output for approximately one millisecond after restoration. This will insure that all storage elements of the electronic circuitry, including the interrupt flip-flop and the motor enable latch 29, as well as the other electronic circuitry, is in a particular known state on resetting of the system.

Thus, the monitored voltage supplies must be in proper operating condition in order to modify the set point of any of the load means 8. If they fail, the system will not permit excitation of any transducer motors 10. If a failure occurs during a conversion cycle, it is automatically and immediately terminated.

Assuming proper voltage conditions, however, the sequence of operation is briefly summarized as follows:

The loop controller 1, upon determination that a new set point is to be established, generates a message frame 4 with the remote station address and the point module address in the first two frame bytes. A point selection command code in the third byte sets the command register output line 22 to enable the register 26. The particular transducer means 9 which is to be selected is carried by final bits of the fourth byte of the message frame and applied to the point selection register 26, with a logic 1 loaded into one of the four flip-flops 31 to enable the proper driver relay 39 and connect the proper feedback potentiometer 14 to the analog-to-digital converter 36. The write-or-select command signal line 25 is also connected to the clock input of the MEL latch to clear the unit. Thus, the first message frame 4 merely loads the selection register 26, connects the corresponding transducer feedback means to the analog-to-digital converter 36, enables the corresponding transducer motor drive means, and insures that the latch 29 is cleared so that the selected motor 10 cannot be driven until the proper set point appears in register 28.

The loop controller 1 then generates an appropriate set point dedicated message frame 4 upon receipt of the previous message frame with proper acknowledgement of the functioning. The set point message frame 4 includes a write command signal which activates the command output line 24 to enable the set point register 28 and loads the new set point into the register 28, and further sets the MEL latch 29. The transducer drive system then completes the automatic resetting with digital conversion of the feedback signal until a null or "equal to" condition generates the appropriate "equal to" signal at line 71 which is effective to clear the motor relay 39 and thereby short circuit the motor 10 and rapidly stop the transducer in the appropriate position, and simultaneously set the interrupt flip-flop latch 30, which immediately terminates the cycling of the analog-to-digital converter 36. The interrupt signal further continuously selects available message frames and transmits the information to the loop controller until an acknowledgement frame is generated by the loop controller with the read command. Such command activates the read line 23 to clear the interrupt latch 30, which resets the disable signal line 87 to again recycle the analog-to-digital converter. The system thus resets to the standby position.

During the period between initiation of the set point readjustment and the interrupt signal, the loop system and controller can, of course, be correspondingly instructing other remote set point adjustment modules to correspondingly activate their systems or can be receiving information from such other units.

In addition, the loop controller 1 can, of course, transmit an inquiry command to merely obtain the information corresponding to that appearing in a filled-in available frame and thereby monitor the status of the point module. Further, a read command signal transmitted to a set point module 5 will permit reading of the set point feedback register 57 and thus the status of the converter.

Figure 2:
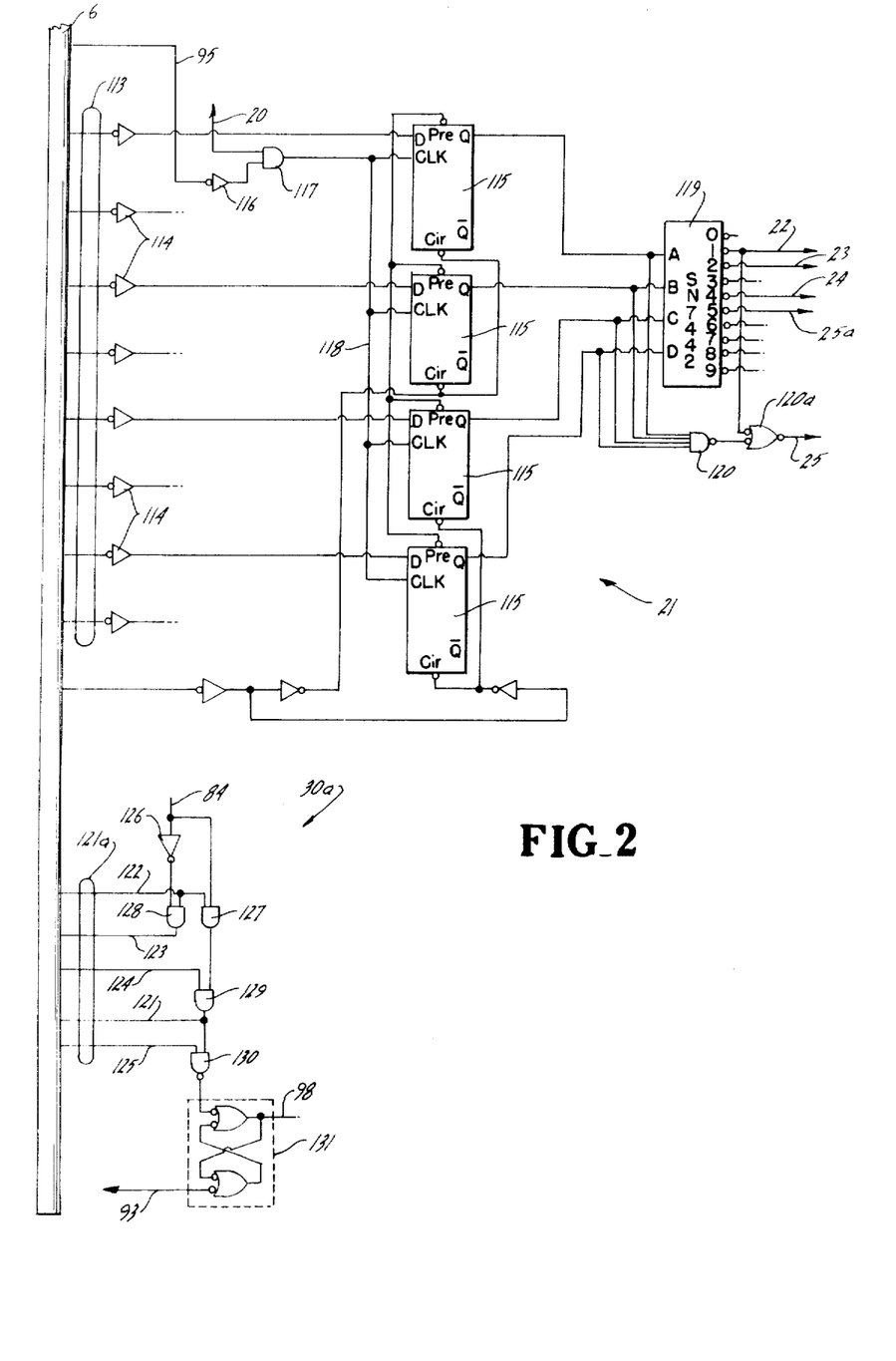
FIG. 2 illustrates in more detail elements shown in block form in FIG. 1.

A satisfactory command register unit is more fully disclosed in FIG. 2. In a practical application, each cable 6 included seventeen input bus lines and ten output bus lines all of which are available to the several point modules 5. The cable 6 in particular includes eight common bus lines 113, four of which are connected to the command register 21 as well as to point module address decoder circuit 19 and registers 26 and 28. Each of the input cable lines 113 is buffered by a suitable logic signal inverter 114 having an inverting input and provides a correspondingly related binary logic signal which is compared with a preset address signal.

The message frame 4 further includes four bit command signals in binary form which, in the illustrated embodiment of the invention, is a four bit command code applied to command register and decoder 21, which is conditioned for operation by the point module enable signal appearing at line 20 of decoder 19. The command decoder 21 basically includes four latch circuits 115, shown as D-type flip-flops one for each of the command binary bits. Each is connected to one of the common bus lines 113 using the common buffering inverter 114. The four bit command code is assembled on the input bus lines by the frame handling unit 7, after which the unit 7 generates a control available signal at the bus line 95 of cable 6. Bus line 95 is connected via a buffering inverter 116 to conjointly control the command decoder 21 with the point module enable signal appearing at line 20 via a suitable AND logic circuit 117. The output of the AND circuit 117 is connected in common to the clock input of four registers 115 via a common line 118 and simultaneously strobes the binary logic signals appearing at the appropriate lines 113 into the respective registers 115. The output of the four registers 115 are coupled as individual inputs to a binary logic decoder 119, shown in block diagram as an SN7442 unit which is a one-of-ten type decoder adapted to provide selected output at any one of ten terminals. In the illustrated embodiment of the invention, the decoder 119 generates the five possible outputs appearing at individual lines 22–24 and 25a which are preconnected to determine the particular function which is to be established on a selected piece of equipment, as shown in FIG. 1.

In addition, the output of the four registers 119 are coupled through a NAND circuit 120 to create a single input to a two input logic circuit 120a, shown as an AND gate. The opposite input of the gate 120a is connected directly to the write output line 24 to generate a common control signal at write or select operation interlock signal line 25.

In FIG. 2, the interrupt request line 84 is also shown connected to actuate a satisfactory priority logic circuit shown in block diagram as 30a in FIG. 1 for obtaining of an available message frame 4.

The interrupt request signal at the request line 84 is latched-in by the appropriate interrupt request circuit, which may include a delay in providing a request input to the priority logic circuitry 30a and allow a transition of a changing input or inputs to stabilize. Upon requesting an available frame 4 through the priority logic unit 30a, several conditions must be met before its request may be placed on the bus 6 through the common cable connection 121a and particularly on a "request output" signal line 121.

First, the point module 5 is connected in a logic priority chain through bus 6 with all other point modules having interrupt capabilities by means of a priority signal at a priority input line 122 and a signal at a priority output line 123. If no other point module with higher priority by means of its relative position on the bus 6 has a request input pending, the point module 5 under consideration will use its request input signal to remove its signal from priority output line 123, thereby preventing all point modules with lower priority from using a request input to generate a request output onto the bus 6.

The frame handling logic unit 7 generates an interrupt strobe signal at line 124 and an interrupt enable signal at line 125 during the processing of an available frame 4. The lines 124 and 125 are connected to the priority logic circuitry 30a and conjointly allow a request output signal to be generated and also sets a logic true the "request granted" signal at line 98.

Having set the request granted signal at line 98, further processing of the available frame occurs as described previously. More particularly, the request input line 84 is connected to the input of an inverter gate 126 and as one input to a two-input AND gate 127. The output of the gate 126 is anded with the signal of the priority input line 122 by an AND gate 128, the output of which is the priority output line 123, to disable other lower priority modules. The signal on priority input line 122 is also anded with the input signal at line 84 by gate 127 and applied to a further AND gate 129 which has a second input connected to line 124. Thus, if an interrupt request is pending and the priority permits, the interrupt strobe signal generates a request output on the output side of gate 129 which is connected to the line 121.

The request output is processed by the frame handling means 7 to provide an Available frame 4 to point module 5 with an interrupt enable signal applied via line 125. This signal is combined with the pending request signal by a two-input NAND gate 130, which has as its inputs the line 121 and the output of gate 129. The gate 130 generates an appropriate signal which is connected to set a flip-flop circuit 131 and thereby generate a request-granted signal at line 98, which is connected to provide for transfer of the information as previously set forth.

The flip-flop circuit 131 constitutes a latch to maintain a request pending which is cleared by the final Acknowledge frame 4 through the general reset line 93 connected to the reset input of the latch circuit 131. This system thus provides for communication with the loop on a priority basis.

As previously noted, the system preferably employs a multiple byte message frame including a loop remote address byte, a point module address byte, a command code byte and a data byte, each of which includes a parity bit to insure the integrity of the information transmission. Failure of any one of the parity checks inhibits the execution of the associated command.

Although particularly illustrated in connection with a transducer motor and feedback potentiometer system, any other form of an analog signal transducer can, of course, be employed. For example, a feedback potentiometer may be directly coupled to a ventilating damper to provide an automatic set point setting of the damper. Other than potentiometer systems can also be employed, as for example, a linear variable differential transformer or optical electric transducer.

Varioud modes of carrying out the invention are contemplated as being within the scope of the following claims, particularly pointing out and distinctly claiming the subject matter which is regarded as the invention.

I claim:

1. In a digital communication apparatus employing binary coded logic message signals continuously transmitted over an interconnecting signal line means in selective sequential groups for remotely selecting and operably interconnecting of any selected ones of a plurality of remote control modules each of which includes operating load means to a controller means, at least some of said modules having adjustable set point load means, the improvement in a set point adjustment means for such load means, comprising a transducer set point drive means coupled to set the load means, start switch means connected to activate said transducer drive means, feedback means having an input connected to said transducer drive means to produce a related output corresponding to the load set point, set point input register means having input means for establishing an output signal corresponding to a desired input, logic control means connected to the signal line means for receiving initiating coded messages and operable to activate said switch means and said register means and to set said input register means and including latch means to establish continued operation of the transducer drive means independently of the messages in response to activation by an initiating coded message, comparing means connected to said feedback means and to said register means and operable to deactivate said transducer drive means, and an interrupt signal means connected to the comparing means to transmit a termination message to the controller means.

2. In the digital communication apparatus of claim 1 wherein said input register means is encoded with a binary logic multiple bit set point number, said transducer means establishing an analog set point signal, said adjustment means including
an analog to digital converter means adapted for connection to the transducer means and establishing a corresponding binary logic multiple bit number,
said comparing means having a pair of inputs connected one to the input register means and one to the converter means.

3. In the digital communication apparatus of claim 2 wherein said set point number is a binary-coded-decimal number encoded in accordance with a percentage of range of the set point adjustment.

4. In the communication apparatus of claim 1 wherein said feedback includes set point feedback register means to establish a binary-coded-decimal number output, said set point input register means includes inputs connected to the loop communication system and set to a selected two-digit binary-coded-decimal number output for 0 to 99 percent of the total set point adjustment span,
said comparing means including a binary-coded-decimal digital comparator means having a first input connected to the set point feedback register and a second input connected to the set point input register and establishing at least two distinct output lines including an "equal to" output line andd difference output line indicating the direction in which the output of the set point feedback register is different than that of the set point input register, and said logic control means connecting said output lines to control said drive means and said interrupt signal means.

5. In the communication apparatus of claim 1 wherein said interrupt signal means includes a latch means having a set input connected to the output of the comparing means and an enable-to-set input and having an interrupt signal line, said logic control means including an enable latch means responsive to a message signal and having an enable signal line connected to said enable-to-set input of the interrupt signal means, said interrupt signal line being connected to said enable latch means to clear the enable latch means.

6. The apparatus of claim 1 wherein said transducer drive means includes a D.C. motor,
an isolated D.C. voltage supply for selective connection to said motor, switch means connecting the power supply to the motor,
said logic control means including a drive selection means connected to actuate said switch means, said drive selection means having a reset means connected to the comparing means.

7. The apparatus of claim 6 wherein said switch means include first contact means connected to short circuit the motor for dynamic braking and second contact means for supplying power to said motor.

8. The apparatus of claim 1 wherein the transducer drive means and said feedback means include individual activating switch means, a transducer selection means connected to the signal line means and establishing a related output connected to enable the feedback switch means, a logic means connected to said drive switch means and including a first interlocking stop input connected to the comparing means to disable the drive switch means and having a second input connected to the selection means, said switch means for the drive means establishing an electrically isolated power supply to the drive means.

9. The apparatus of claim 1 including power monitoring means for monitoring logic and operating voltage supplies and having output means connected to deactivate the latch means and the transducer drive means in response to a power failure.

10. The apparatus of claim 9 wherein a logic supply monitoring means establishes a reset pulse upon return of a failed logic supply and is connected to clear the interrupt signal means, the latch means and the input register means to establish a known operative starting condition upon power reset.

11. In the digital communication apparatus of claim 1 having a plurality of transducer drive means and related feedback means wherein said controller means generates time-spaced multiple bit message frame to remote stations connected in a serial loop and each remote station including at least one point module, each remote station having a message frame handling means for selective coupling of the signal line means to the modules for communication via the message frames, said set point module having an address decoder for receipt of a message frame, a command register means connected to the decoder and the signal line means and selectively establishing a write command output, a read command output, a select command output, and an interrupt clear output, and logic circuit means connecting said outputs to sequentially select the transducer drive means for operation and to set the input register means, said message frames including means to inform the controller of said last condition to generate a message frame enabling the write command output and activate the readjustment means to reset the load means, said loop controller responding to receipt of said termination message frame to transmit a clear message frame to activate the interrupt clear output and reset the interrupt signal means.

12. In the digital communication apparatus of claim 11 wherein the loop controller initiates a readjustment by a first message frame activating said select output to enable one of a plurality of transducer drive means and related feedback means, said first message frame being acknowledged by the point module, said loop controller recognizing said acknowledgement and transmitting a second message frame activating said write command to enable the logic control means and to set the set point input register means.

13. In the digital communication apparatus of claim 11 wherein said interrupt signal is operable to sequentially receive available message frames and said corresponding point module introducing its address into each said frame and the content of the point select register means and output of the logic control means and the comparing means, said loop controller transmitting said clear message frame and activating the read command to reset said interrupt signal and terminating the filling of available message frames and introducing the output of the feedback means into the corresponding frame, said module acknowledging said interrupt frame for transmission to the controller means.

14. In a digital communication apparatus employing binary logic multiple bit message frames generated by a central controller and transmitted to a plurality of remote stations each having point modules for controlling a load means and at least some of said modules having a plurality of set point load means, said station having a frame handling and module selection means for directing of message frames to and from the modules in a predetermined pattern via a common bus means, the improvement in a self-contained set point adjustment means selectively actuating a set point load means at each remote station, comprising a decoding address and command register means connected to the bus means for selectively receiving such message frame and including a binary logic processing circuit providing controlling command signals for selection of one of the set point load means, a plurality of analog signal transducer means including one for each load means, an analog-to-digital converter means adapted to receive an analog signal and establish a digital coded binary output signal, a selection register means connected to the bus means and to said command register means and having separate output means related to each transducer means and operable to selectively connect one of the transducer means as the input signal source to the analog-to-digital converter means, a set point input register means having inputs connected to the loop communication system and adapted to be set to a selected digital coded output corresponding to a readout of the converter means, a digital code comparator means having a first input connected to the converter and a second input connected to the set point input register and establishing an "equal to" output and a "directional difference" output in accordance with the set point register means output relative to the converter output, an initiate and interrupt request control means including an enable latch means including an input connected to the command register means and having an enable output means connected to the selection circuit means to selectively enable the transducer means connected to the converter means, said control means including an interrupt latch means defining an interrupt output means and connected to said enable output means, said interrupt latch means being connected to the "equal-to" output of the digital comparator means to terminate operation of the analog-to-digital converter means and to disable the transducer drive means to maintain the set point adjustment in accordance with the "equal-to" set condition, said interrupt output means connected to the common bus and connected to the frame selection means for obtaining and filling an available message frame for informing the loop controller of the adjustment completion by a notification frame, and said interrupt latch means including means connected to said command register means to deactivate the interrupt signal line and to reset the station to standby in response to receipt of an appropriate acknowledgement message frame.

15. In the digital communication apparatus of claim 14 wherein said command register means includes a select output, a write output, a read output and a clear output, said loop controller establishing a message frame including a selection frame containing a selection code and a command code activating the select output to insert the selection into the selection register means and to clear the latch means, a start frame including a new set point code and a write command code activating the output to insert a new set point in the set point register means and to set the enable latch means, setting of the latch means initiating the automatic readjustment of the set point to the new set point and activating the interrupt latch means.

16. In the digital communication apparatus of claim 14 wherein said notification message frame includes the module address, the setting outputs of the selection register means and the status of the enable latch means and the comparator, and said acknowledgement frames having the set point feedback register output placed therein and setting the analog-to-digital converter to a start position.

17. The apparatus of claim 14 wherein the setpoint register means includes a two digit binary-coded-decimal output, the analog to digital converter is a two digit binary-coded-decimal unit of the successive approximation construction having a start input to initiate the operation of the converter and a cycling means to continuously cycle the converter to track the analog input signal, said last named means including a logic means including a first input connected to the command register means and interrupt means to selectively start and terminate the converter.

18. In the communication apparatus of claim 17 having a digital register connected to the output of the converter and having a clock input wherein said cycling means includes a first and a second pulse unit connected in cascade between a done output and a start input of the converter, said logic means being a gate means connected between the pulse units, said first pulse unit being connected to the output of the converter to generate a recycle signal, and being connected to the clock input of the register to set the register with the last conversion, said gate means having a second input means connected to the output of interrupt latch means to terminate operation of the converter, said interrupt latch means having a clock input for setting of the latch means, a logic gate connected to clock input to the interrupt latch means and having a first input connected to the equal-to output of the comparator means and a second input connected to the output of the first pulse unit of the converter.

19. In the communication apparatus of claim 18 wherein said first enable latch means includes a write input connected to the command means to set the latch means and a write-or-select input connected to the command means to clear the latch means, said second latch means including a data input connected to the output of first latch means and being responsive to a signal at said clock input, the output of the interrupt latch means being connected to clear the enable latch means.

20. In the communication apparatus of claim 19 including a voltage monitoring means, a monitoring logic gate means connected to the output of the interrupt means and establishing a reset output to clear the enable latch means and to deactivate the converter and stop the transducer means, said logic gate means having a second input means connected to the voltage monitoring means.

21. In the communication apparatus of claim 20 wherein said voltage monitoring means includes a logic supply monitor including a timing pulse means to establish an extended reset pulse in response to return of the logic supply to establish the reset output of the monitor gate means, said logic supply monitor being connected to clear the interrupt latch means.

22. In the communication apparatus of claim 18 wherein each of said transducer means includes a drive means coupled to set the set point and to simultaneously establish a corresponding variable voltage source, an isolated power supply connection means, first relay means connecting said connection means to said drive means, second reversing relay means connected between said connection means and said first relay means, first gate means connected to selectively energize said first relay means and including a first input connected to the selection register means for selectively enabling the relay means, a second gate means connected to said first gate means and having a first input connected to the enable latch means to activate the first gate means and a second input connected to the comparator to disable the first gate means, a third gate means having a first input connected to the enable latch means and a second input connected to the comparator to energize the reversing relay means in response to a selected difference in the inputs to the comparator.

23. In the communication apparatus of claim 22 including a solid state high input impedance switching means for selectively connecting the voltage source to the comparator, said switching means having inputs connected to the selection means in common with an input to a corresponding first gate means.

24. In the digital communication apparatus of claim 14 wherein said enable latch means includes a clear input to remove the output, a multiple input logic gate connected to said clear input, a power supply monitor for the point module connected to an input of the gate, logic power supply monitor for the point module connected to an input of the gate and operable in response to a logic power up condition, and said enable latch means including a clock input connected to the command means and activated simultaneously with the selection register means.

25. In the communication apparatus of claim 14 wherein said transducer means includes a direct current reversible drive means and a voltage source means coupled to the drive means, an isolated direct current power connection means, relay switching means selectively connecting the drive means to the power connection means, and a solid state high impedance electronic switch connecting the voltage source means to the comparator.

26. In the communication apparatus of claim 25 wherein the drive means is a D.C. motor, said relay means having a normally closed contacts connected directly across said motor to dynamically brake the motor, said source including a feedback potentiometer having a movable tap connected to the converter and coupled to the motor.

27. In the communication apparatus of claim 25 having a directional relay means connected to control the power connection of the motor, a gate means connected to the difference output means of the comparator and to the enable latch means.

28. In a digital communication apparatus employing a central controller connected in a serial communication loop with a plurality of remote stations, said remote stations including setpoint readjustment means comprising input register means establishing a readout in accordance with a desired setpoint and feedback means establishing a readout in accordance with the setpoint, said readouts being proportional to the percentage of the total setpoint span of the transducer means.

29. In the digital communication apparatus of claim 28 wherein said input register means and said feedback means are similar eight bit wide readouts establishing two digit binary-coded-decimal logic signals encoded to include 0 to 99 percent of the total adjustment span.

30. In a digital communication apparatus employing a central controller connected in serial communication loop with a plurality of remote stations, at least one of said remote stations including an automatic setpoint readjustment having an analog-to-digital converter to establish a digital output in accordance with an analog input, digital logic processing means having a plurality of flip-flip units for controlling the converter, a logic power supply for supplying of logic power to remote stations, a voltage monitoring means including a delay means and connected to reset the flip-flop units and to start the converter and thereby actuate the set point adjustment means from a selected operable condition in response to logic supply power on.

31. In a digital communication apparatus employing binary coded logic message signals including multiple bit binary command signals transmitted over an interconnecting signal line means in selective sequential signal groups for remotely selecting and operably interconnecting of any selected ones of a plurality of remote control modules and producing a plurality of functions at a selected module, the improvement in a command register means for establishing such functions, comprising a plurality of latch means for selectively producing different output combinations in accordance with the multiple bit binary command signals, a decoder having a plurality of output lines and connected to said latch means and establishing a plurality of outputs at individual output lines in accordance with the output of the latch means, and means connecting said output lines to control the module functions.

32. The apparatus of claim 31 wherein each of the latch means includes a reset input, and means to simultaneously impress a reset signal on all of said reset inputs to clear the command register.

33. The apparatus of claim 31 including a logic means connected to the output of the latch means and to one of the output lines of the decoder to produce a combined function output line.

34. The apparatus of claim 31 including a first mutiple input logic gate having a separate input connected to the output of each of the latch means, and a second dual input logic gate having a first input connected to the output of the first logic gate and a second input connected to a selected output line of the decoder.

35. In the communication apparatus of claim 1 wherein the setpoint remote station includes a plurality of point modules adapted to transmit data to the loop controller including the setpoint readjustment means, means for connection of the register means to the loop for transmission of the output of the register means, and a priority circuit means connected to said loop and to each of said modules, said priority circuit means including logic means connected between said modules to selectively enable the modules to transmit data in accordance with a selected sequence when more than one module has requested a message frame.

36. In a digital communication apparatus employing binary coded logic message signals including multiple bit binary command signals transmitted over an interconnecting signal loop means in selective sequential signal groups each defining a message frame for remote control of a plurality of load point modules, said modules including means to transmit binary data to fill a message frame, a priority data transmission means including a separate decoding means for each module selectively connecting said modules to transmit data, said priority data transmission means comprising a logic means having a request input for requesting a frame and a request granted output for initiating data transfer from a module, said logic means including logic unit connected to the request input and to other priority decoding means to disable all other modules of a lower priority from transmitting binary data, a second logic unit connected to the first logic unit of other modules to selectively establish a frame request output to the loop, and a resettable latch logic unit responsive to the second logic unit and to a signal received from the loop to establish said request output as a request granted output.

37. The apparatus of claim 36 wherein said latch logic unit includes a reset means connected to the loop means for receiving a reset signal means.

* * * * *